Patented Aug. 8, 1950

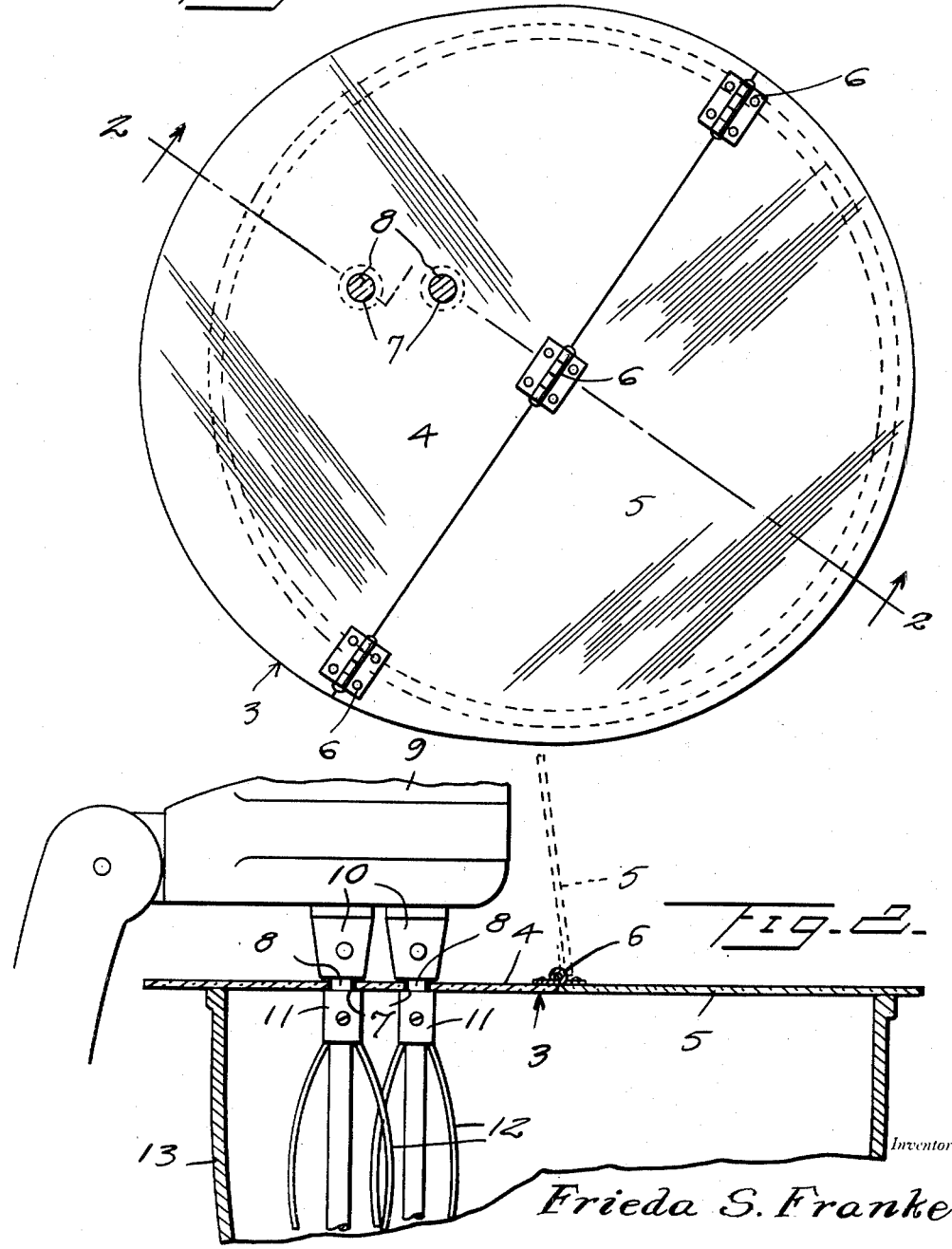

2,517,648

UNITED STATES PATENT OFFICE 2,517,648

BOWL COVER ATTACHMENT FOR ELECTRIC FOOD MIXERS

Frieda S. Franke, Uvalde, Tex.

Application May 28, 1948, Serial No. 29,788

2 Claims. (Cl. 259—119)

This invention relates to a novel bowl cover attachment adapted for use with electric food mixers for covering the open top of the bowl to prevent splattering during the mixing of fluids and to prevent the escape of dust from the bowl when mixing dry material.

More particularly, it is an aim of the present invention to provide a cover adapted to be demountably supported on the beater shafts so that the mixing bowl covered thereby may readily rotate therebeneath and relatively to the cover.

Still another object of the invention is to provide a cover preferably formed of a transparent, relatively light weight material which is substantially rigid and which is provided with a hinged section capable of being readily swung upwardly for exposing a portion of the bowl for adding ingredients during the mixing operation.

Various other objects and advantages of the invention will hereinafter become more fully apparent from the following description of the drawing, illustrating a presently preferred embodiment thereof, and wherein:

Figure 1 is a plan view of the cover attachment, and

Figure 2 is a sectional view thereof taken substantially along a plane as indicated by the line 2—2 of Figure 1 and showing the cover as it will appear in an applied and operative position.

Referring more specifically to the drawing, the novel cover attachment for electric mixer bowls, designated generally 3 may be formed of any suitable substantially rigid transparent material such as a plastic and is composed of the sections 4 and 5 which are connected along their meeting edges by hinges 6 to permit the section 5 to be swung upwardly relatively to the section 4, for a purpose which will hereinafter become apparent.

The section 4 is provided with two openings 7 through which the two beater shafts 8 of an electric mixer 9 are adapted to be passed upwardly before attaching the ends of the beater shafts 8 to the beater shaft sockets 10 of the mixer 9 and so that a portion of the underside of the cover section 4 will rest on the upper collars 11 which support the beaters 12 on the shafts 8. The cover 3 is adapted to be of relatively light weight so that it may be readily supported by the collars 11 and while resting on the rim of a mixing bowl 13 in which the beaters 12 are disposed, will not have sufficient frictional engagement therewith to prevent the bowl 13 from revolving freely relatively to the cover 3 when the beaters 12 are in operation, as is conventional. From the foregoing it will be readily apparent that the cover 3 when in its full line position of Figure 2 will effectively function to prevent a fluid material, not shown, within the bowl 13 from splattering therefrom when agitated by the beaters 12 and will permit the contents of the bowl to be viewed through said cover to permit the operator to readily discern when the mixing operation has been accomplished. The cover 3 is provided with the hinged section 5 and is adapted to be swung upwardly as seen in dotted lines in Figure 2 while the mixer 9 is operated and so that certain ingredients can be added to the bowl during the beating or mixing operation as is required for certain mixtures. It will likewise be readily apparent that the cover 3 will effectively function to prevent the escape of dust from the bowl 13 when mixing dry material.

As seen in Figure 1, the periphery of the cover 3 is of an irregular shape and of sufficient size to overlie the rim of the bowl 13 sufficiently so that said cover may be used with mixing bowls of different sizes. It will also be noted that the openings 7 are located in relatively close proximity to a portion of the periphery of the cover 3 for adapting said cover to a particular type of electric mixer. However, it will be readily apparent that the location of the openings 7 will vary depending upon the particular make of mixer with which the cover is intended for use and the spacing of the openings and the number of said openings will likewise vary to accommodate the cover to electric mixers having more or less than two beater shafts. Further, the shape of the periphery of the cover 3 will vary for different makes of mixers and the size and location of the swingable section 5 thereof may also be varied accordingly since the drawing is only intended to illustrate one embodiment of the cover for use on a particular type of electric mixer. Similarly, the cover could be formed of a non-transparent material. It is also contemplated that the portion of the cover adjacent the openings 7 may be downwardly or upwardly offset with respect to the plane of the remainder of the cover for correctly positioning the cover with respect to the rim of the bowl when the portion of the cover adjacent the openings 7 are resting on the beater collars 11.

Various other modifications and changes are likewise contemplated and may obviously be resorted to, without departing from the spirit or scope of the invention as hereinafter defined by the appended claims.

I claim as my invention:

1. An electric food mixer comprising a motor adapted to be disposed above the open top of a mixing bowl and movable relatively thereto, said motor having a pair of depending drive shafts each terminating in a downwardly opening socket, a detachable beater unit including parallel shafts having upper ends detachably secured in the sockets, beater elements fixed to the beater shafts beneath the sockets, said drive shafts providing a support for the beater unit and the sockets forming a driving connection between the beater shafts and drive shafts, a collar fixed to each beater shaft beneath and spaced from the drive shaft sockets and above the beater elements, a substantially flat bowl cover having spaced openings therein loosely receiving the upper portions of the beater shafts and of smaller diameter than the collars whereby the cover will be supported by engagement on said collars and above the bowl when the beater elements are disposed in the bowl, said cover being larger than the open top of the bowl and being normally disposed in contact or substantially in contact with the bowl rim to cover the open top of the bowl when the beaters are in operation.

2. An electric food mixer as in claim 1, said cover being formed of sections, one of said sections being provided with the beater shaft receiving openings, and hinge means secured to the upper surfaces of said cover sections and swingably mounting the other cover section relatively to the cover section provided with said openings and disposed whereby complementary edges of the cover sections will be disposed in abutting engagement when the two sections are in the same plane to permit the last mentioned cover section to be swung upwardly from a position in the same plane as the first mentioned cover section and to support said last mentioned cover section against swinging movement downwardly below the plane of the first mentioned cover section.

FRIEDA S. FRANKE.

REFERENCES CITED

The following references are of record in the file of this patent:

UNITED STATES PATENTS

| Number | Name | Date |
|---|---|---|
| 326,936 | Beard | Sept. 29, 1885 |
| 370,812 | Oliver | Oct. 4, 1887 |
| 430,783 | Mulford | June 24, 1890 |
| 1,179,984 | Vidingoff | Apr. 18, 1916 |
| 2,321,453 | Boileau | June 8, 1943 |